United States Patent
Heckel et al.

(10) Patent No.: US 6,321,882 B1
(45) Date of Patent: Nov. 27, 2001

(54) EXTERNAL MANUAL BRAKE RELEASE

(75) Inventors: John B. Heckel, Bloomington; Wayne B. Wenker, Eden Prairie, both of MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/382,867

(22) Filed: Aug. 25, 1999

(51) Int. Cl.[7] ..................................................... F16D 55/08
(52) U.S. Cl. ...................... 188/72.9; 188/72.6; 418/61.3
(58) Field of Search ................. 188/72.6, 72.8, 188/170, 196 M, 72.9; 418/61.3

(56) References Cited

U.S. PATENT DOCUMENTS

| | | | |
|---|---|---|---|
| 3,616,882 | 11/1971 | White | 192/3 R |
| 3,688,875 * | 9/1972 | De Hoff et al. | 188/71.9 |
| 3,848,704 * | 11/1974 | Falk | 188/71.8 |
| 3,960,470 | 6/1976 | Kinder | 418/61 B |
| 4,592,704 * | 6/1986 | Beniek | 418/61.3 |
| 4,981,423 | 1/1991 | Bissonnette | 418/61.3 |
| 6,062,835 * | 5/2000 | Acharya et al. | 418/61.3 |
| 6,132,194 * | 10/2000 | Wenker et al. | 418/61.3 |

* cited by examiner

*Primary Examiner*—Christopher P. Schwartz
(74) *Attorney, Agent, or Firm*—L. J. Kasper

(57) ABSTRACT

A brake assembly of the type in which there are provided brake discs (87,89) which are pressed into frictional engagement by a lock piston (65). The lock piston is of the type applied by a set of Belleville washers (73) and released by fluid pressure in a chamber (113). The invention provides a disengagement mechanism (95) associated with the lock piston (65) and including a manually operable handle (107) disposed external to a housing (21) enclosing the brake assembly. The handle is moveable between a normal position (FIG. 2) and a disengagement position (FIG. 4) in which the lock piston is moved toward at least a partially retracted position, in opposition to the force of the Belleville washers. When pressurized fluid is again communicated to the chamber (113), the lock piston is biased to its fully retracted position, and the handle (107) of the disengagement mechanism (95) returns to its normal position (FIG. 2), ready for the next time the operator wants to manually disengage the brakes.

8 Claims, 5 Drawing Sheets

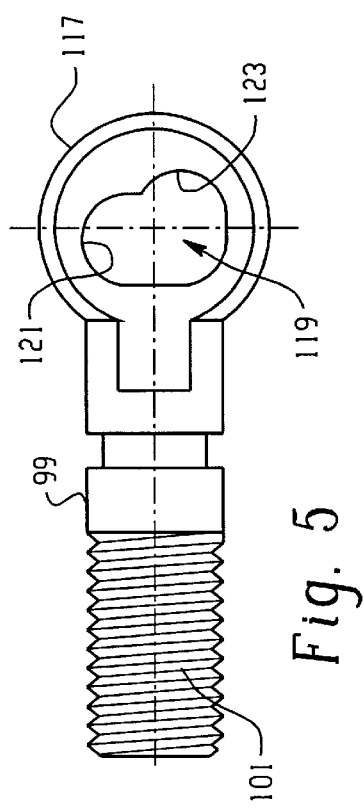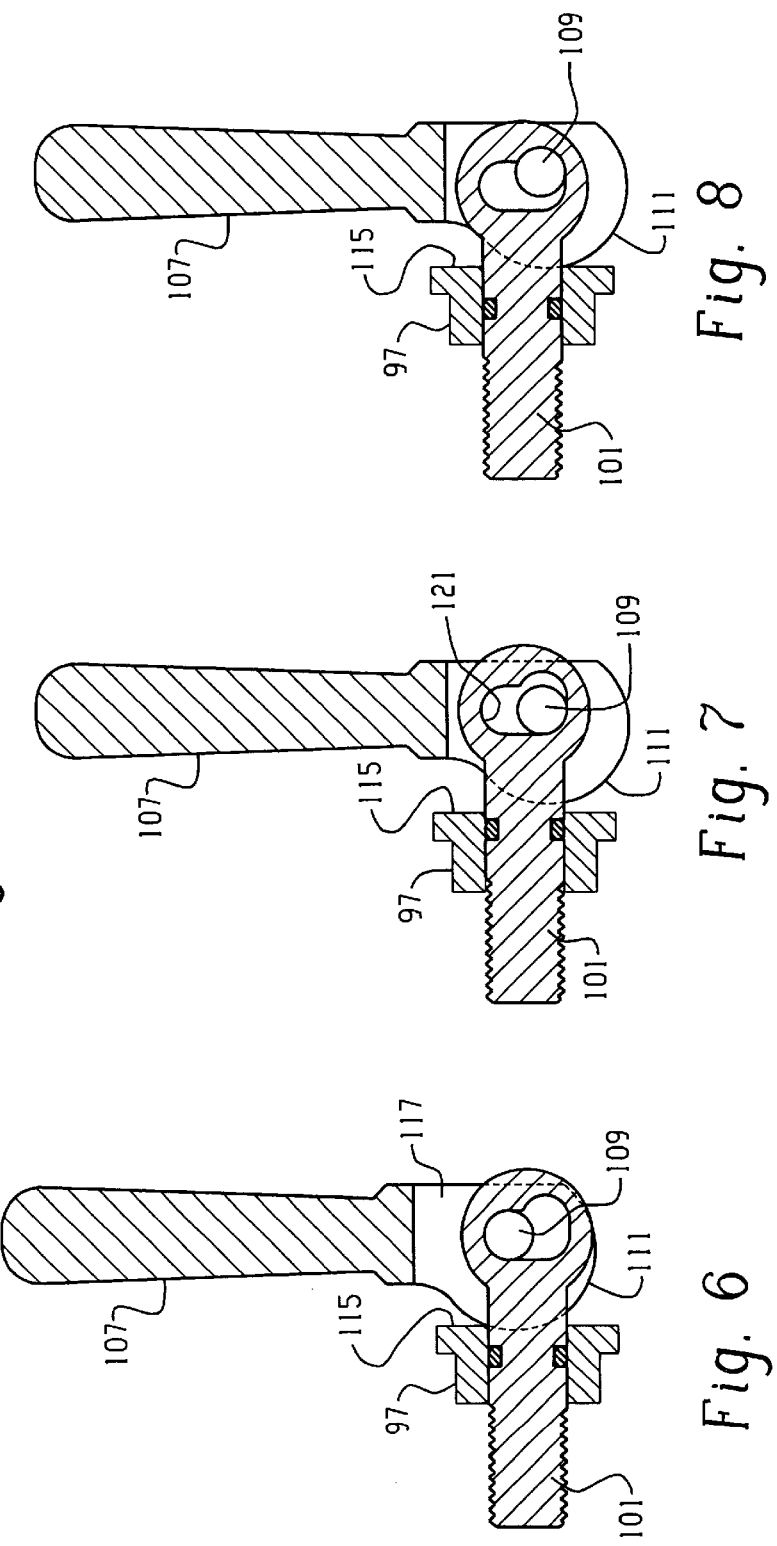

EXTERNAL MANUAL BRAKE RELEASE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to brake assemblies, and more particularly, to such brake assemblies of the type intended for use with fluid pressure actuated devices such as hydrostatic motors. Although the present invention is not actually limited to being used with a fluid pressure actuated device, the invention does rely in part on the presence of pressurized fluid for its operation, and therefor, the invention will be described in connection with a hydrostatic motor.

Although the present invention may be included advantageously with many different types of fluid pressure actuated devices, it is especially adapted for use with a low-speed, high-torque gerotor motor, and will be described in connection therewith. As is well known to those skilled in the art, brake assemblies are an important feature of many low-speed, high-torque gerotor motors, especially when such motors are utilized for vehicle propel applications. Many vehicles propelled by hydrostatic drive circuits, including gerotor motors, are operated on hilly terrain and on work sites involving grades, such that some sort of motor braking capability is essential.

For years, many of the gerotor motors made and sold commercially, both by the assignee of the present invention as well as by others, have had the motor valving disposed "forwardly" of the gerotor gear set (i.e., toward the output shaft end of the motor), thus having nothing disposed "rearwardly" of the gerotor gear set except for an endcap. The present invention is not so limited, but is especially adapted for use with gerotor motors of this type, and will be illustrated and described in connection therewith.

In many vehicle applications for low-speed, high-torque gerotor motors, the motor can have either a parking brake or parking lock, the term "lock" being preferred in some instances because it is intended that the parking lock be engaged only after the vehicle is stopped. In other words, such parking lock devices are not intended to be dynamic brakes, which would be engaged while the vehicle is moving, to bring the vehicle to a stop. However, the term "brake" will generally be used hereinafter to mean and include both brakes and locks, the term "brake" being somewhat preferred to cover a device which can be applied gradually and to distinguish from a device which would operate either fully engaged or fully disengaged.

For many years, those skilled in the art have attempted to incorporate brake and lock devices into gerotor motors, as opposed to merely adding a brake package on the motor output shaft. The desire for a brake assembly to be incorporated into the motor is based on the need to keep the overall motor package as small and compact as possible, whereby a motor brake can be added, but without the need to re-design the surrounding portion of the vehicle. Examples of such brake devices are illustrated and described in U.S. Pat. Nos. 3,616,882 and 4,981,423. In the device of U.S. Pat. No. 3,616,882, a braking element is disposed adjacent the forward end of the gerotor star, and is biased by fluid pressure into frictional engagement therewith. Such an arrangement involves a certain degree of unpredictability of performance, in view of variations in clearances, etc. Such an arrangement also requires a substantial redesign of the wear plate and forward bearing housing of the motor. In the device of U.S. Pat. No. 4,981,423, there is a multi-disc brake assembly which is of the "spring-applied, pressure-released" type. The arrangement of U.S. Pat. No. 4,981,423 also requires almost total redesign of the forward bearing housing, and also results in a much larger bearing housing. In addition, the disc pack is in splined engagement with the output shaft and, therefore, must be able to brake or hold the full output torque of the motor, thus necessitating that the discs, the spring, and the apply/release piston all be relatively larger.

On many of the vehicles of the type which would use gerotor motors equipped with spring applied, pressure released type brakes, there are frequently situations where it is necessary to be able to tow the vehicle. Unfortunately, while the vehicle is being towed, and the vehicle hydraulic system is not operating, the motor brake is spring applied, such that the vehicle could not be towed. It is now known to provide a separate source of hydraulic pressure, such as a hand pump, which can be used to pressure release the brake in those situations where it is necessary to tow the vehicle. However, the addition of a separate pump simply for the purpose of manually releasing the brake adds substantially to the overall complexity and cost of the motor and brake system.: In addition, when the vehicle is to be operated normally again, there must be a mechanism for relieving the hydraulic pressure holding the brakes in their-released position, adding even further to the cost and complexity of the system.

BRIEF SUMMARY OF THE INVENTION

Accordingly, it is an object of the present invention to provide an improved brake assembly, for use with fluid pressure actuated devices, wherein the brake assembly includes a means for manually releasing the brake which is relatively simple and inexpensive, and does not add substantially to the overall size or complexity of the brake assembly.

It is a more specific object of the present invention to provide an improved brake assembly which achieves the above-stated object, wherein subsequent operation of the device, and pressure release of the brake assembly causes the release mechanism to return to its normal condition.

The above and other objects of the invention are accomplished by the provision of a brake assembly including housing means defining an internal chamber. A first means defines a first braking surface fixed to be non-rotatable relative to the housing means, and a second means defines a second braking surface fixed to be non-rotatable relative to an output member. A lock piston is disposed in the internal chamber and is moveable between a retracted position and an applied position in which the lock piston causes engagement of the first and second braking surfaces to retard movement of the output member relative to the housing means. A mechanical biasing means is operably associated with the lock piston and is operable continually to bias the lock piston toward the applied position. The housing means and the lock piston cooperate to define a pressure chamber operable, in the presence of pressurized fluid in the pressure chamber, to bias the lock piston toward the retracted position.

The improved brake assembly is characterized by a disengagement means operably associated with the lock piston and including a manually operable handle disposed external to the housing means. The manually operable handle is moveable between a normal position and a disengaged position operable to move the lock piston toward at least a partially retracted position in opposition to the force of the mechanical biasing means.

BRIEF DESCRIPTION OF THE DRAWINGS

FIG. 5 is an external view of an alternative embodiment of the bolt which comprises part of the disengagement mechanism.

FIGS. 6 through 8 are axial cross-sections illustrating different operating conditions of the alternative embodiment of the present invention.

DETAILED DESCRIPTION OF THE PREFERRED EMBODIMENT

Figure 1:
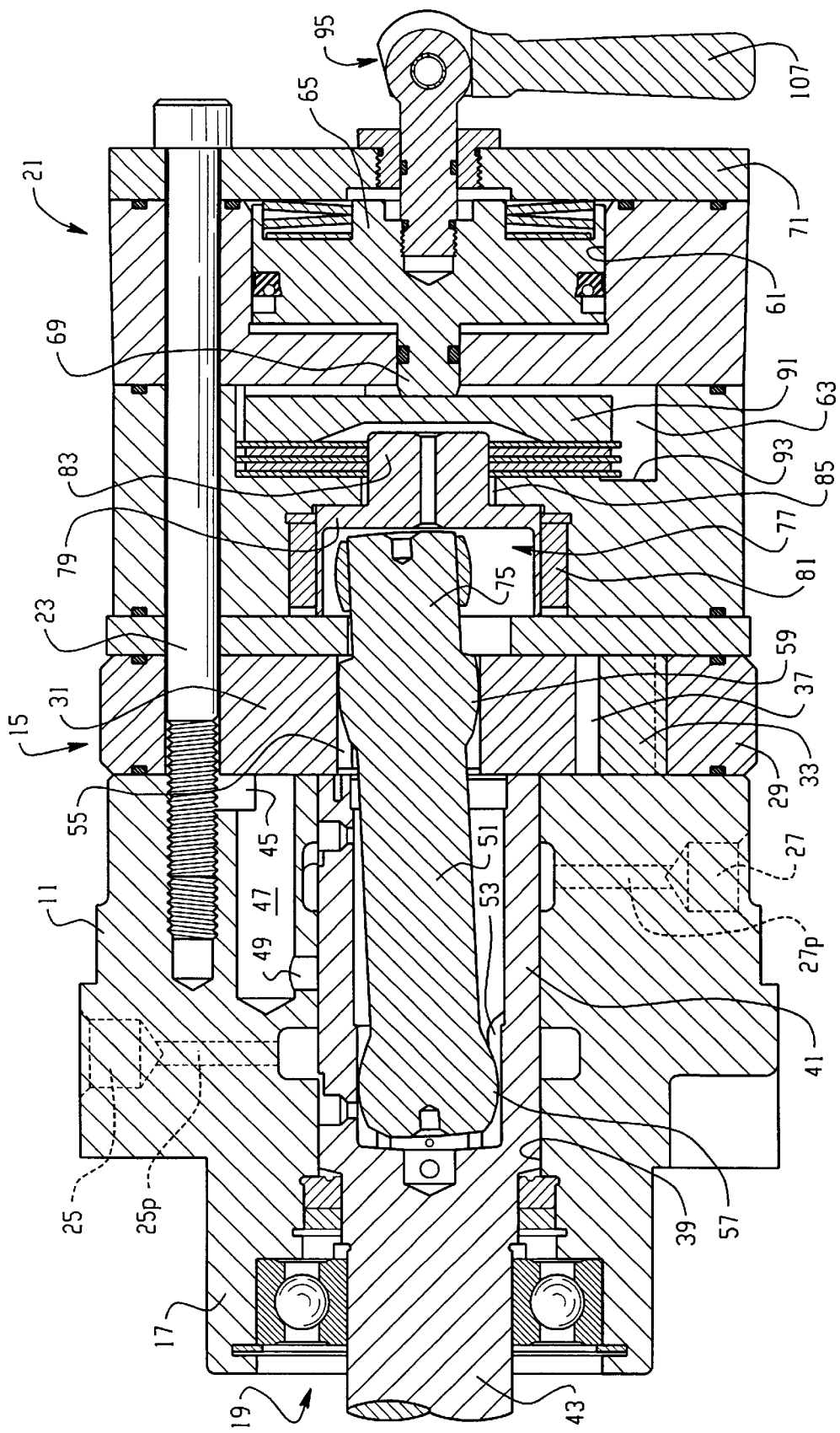
FIG. 1 is an axial cross-section of a gerotor motor including a parking brake assembly made in accordance with the present invention, in its normal position.

Referring now to the drawings, which are not intended to limit the invention, FIG. 1 is an axial cross-section of a low-speed, high-torque gerotor motor of the type with which the parking brake assembly of the present invention is especially advantageous. The gerotor motor shown in FIG. 1 may be of the general type illustrated and described in U.S. Pat. No. 4,592,704, assigned to the assignee of the present invention and incorporated herein by reference, and sold commercially by the assignee of the present invention.

The gerotor motor of FIG. 1 comprises a valve housing section 11, and a fluid energy-translating displacement mechanism, generally designated 15, which, in the subject embodiment, is a roller gerotor gear set. The motor includes a forward portion 17, which surrounds a ball bearing set 19, and a rearward endcap assembly 21, held in tight sealing engagement with the valve housing section 11 by means of a plurality of bolts 23. The valve housing section 11 includes a fluid inlet port 25, and a fluid outlet port 27, shown only in dashed lines in FIG. 1. It is understood by those skilled in the art that the ports 25 and 27 may be reversed, thus reversing the direction of operation of the motor.

Referring still to FIG. 1, the gerotor gear set 15 includes an internally-toothed ring member 29, through which the bolts 23 pass (only one of the bolts 23 being shown in FIG. 1), and an externally-toothed star member 31. The internal teeth of the ring member 29 comprise a plurality of cylindrical rollers 33, as is now well known in the art. The teeth 33 of the ring 29 and the external teeth of the star 31 interengage to define a plurality of expanding and contracting volume chambers 37, as is also well known in the art.

The valve housing section 11 defines a spool bore 39, and rotatably disposed therein is a spool valve 41. Formed integrally with the spool valve 41 is an output shaft 43, shown only fragmentarily in FIG. 1. In fluid communication with each of the volume chambers 37 is an opening 45 defined by the valve housing section 11, and in fluid communication with each of the openings 45 is an axial passage 47, also formed in the valve housing section 11. Each of the axial passages 47 communicates with the spool bore 39 through an opening 49. The housing section 11 also defines fluid passages 25p and 27p, providing fluid communication between the spool bore 39 and the inlet port 25 and outlet port 27, respectively.

Disposed within the hollow, cylindrical spool valve 41 is a main drive shaft 51, commonly referred to as a "dog bone" shaft. The spool valve 41 defines a set of straight internal splines 53, and the star 31 defines a set of straight internal splines 55. The drive shaft 51 includes a set of external crowned splines 57 in engagement with the internal splines 53, and a set of external crowned splines 59 in engagement with the internal splines 55. Thus, the orbital and rotational movements of the star member 31 are transmitted, by means of the dog bone shaft 51, into purely rotational movement of the output shaft 43, as is well known in the art.

The spool valve 41 defines a number of annular grooves and axial slots to facilitate communication of pressurized fluid from the inlet port 25 through the spool valve 41 and out to the expanding volume chambers of the gerotor gear set 15, in a manner well known to those skilled in the art. Fluid is then communicated from the contracting volume chambers of the gerotor gear set 15, back through the spool valve 41, and out to the outlet (return) port 27. The commutating valving action which takes place is well known to those skilled in the art, and is utilized in several different models of "spool valve" motor made by the assignee of the present invention.

Those portions of the motor described up to this point are generally conventional and well known in the art. Referring still primarily to FIG. 1, but also now to FIG. 2, the brake assembly of the present invention will be described. The rearward end cap assembly 21 defines a rearward internal chamber 61, and a forward internal chamber 63. In the subject embodiment, both of the chambers 61 and 63 are generally cylindrical, although it should be understood that such is not an essential feature of the invention. Disposed within the rearward chamber 61 is a generally cylindrical lock piston 65, which includes some sort of seal 67 disposed about its outer periphery, and in sealing engagement with the internal surface of the chamber 61. The lock piston 65 includes a forwardly extending engagement portion 69. Disposed rearwardly of the piston 65, the internal chamber 61 is bounded by an end cap member 71, and disposed axially between the piston 65 and the end cap member 71 is a set of Belleville washers 73, which bias the lock piston 65 in a forward direction (to the left in FIGS. 1 and 2), toward a "brake engaged" or "spring applied" position, as will be described in greater detail subsequently.

Referring again primarily to FIG. 1, it should be noted that the drive shaft 51 includes a rearward, terminal portion 75 which is received within an elongated opening 77 of a generally annular brake member 79. The brake member 79 is shown, in the subject embodiment, as being supported relative to the end cap assembly 21 by a roller bearing set 81. The brake member 79 includes a rearward portion 83 having a set of external splines 85, and in engagement with the splines 85 is a set of brake disks 87. Interleaved with the brake disks 87 is a set of brake disks 89 which are fixed to be non-rotatable, by any suitable means, relative to the adjacent housing member of the end cap assembly 21.

Figure 2:
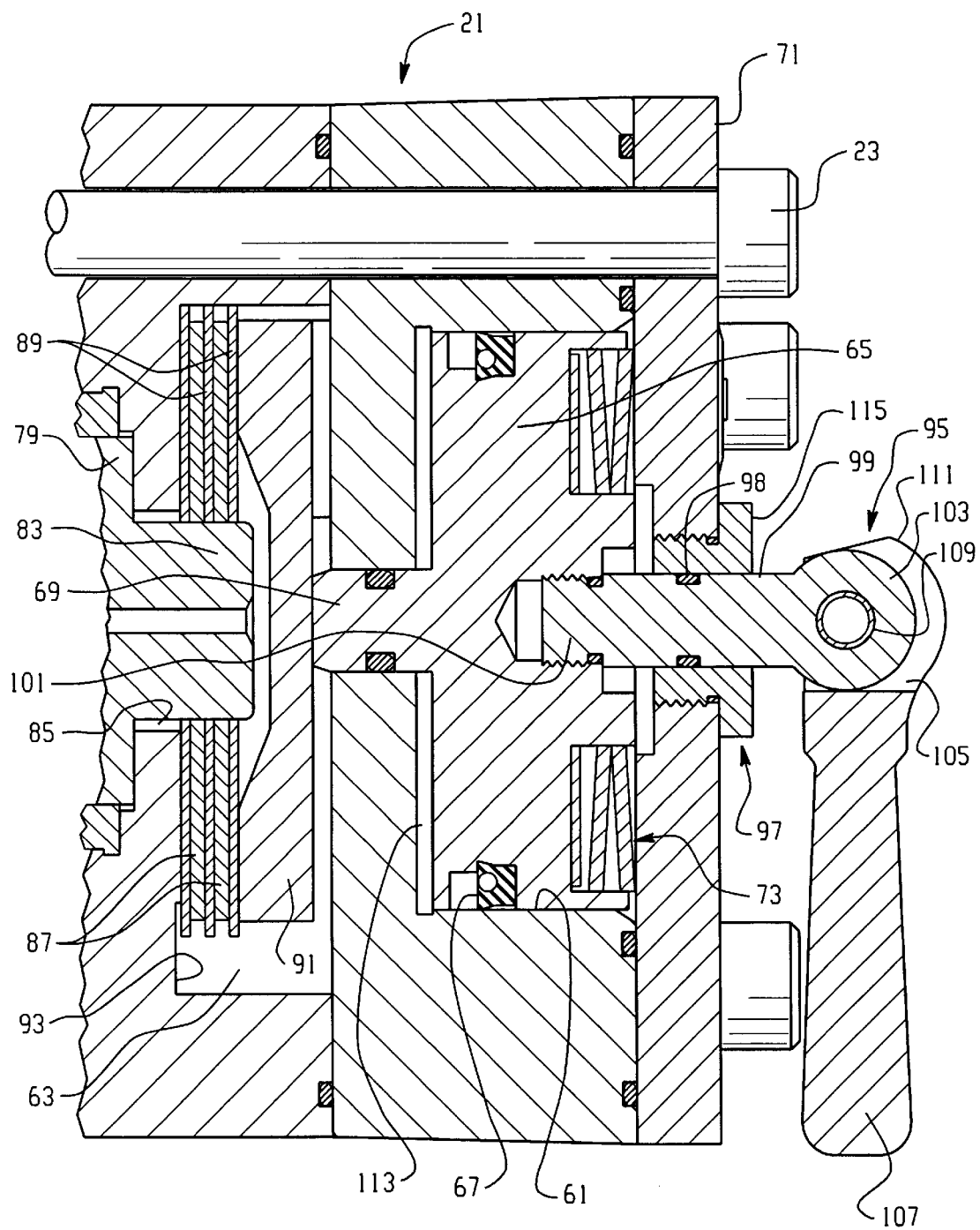
FIG. 2 is an enlarged, fragmentary, axial cross-section, similar to FIG. 1, with the brake release mechanism of the present invention in its normal position.

Disposed immediately adjacent (to the right in FIGS. 1 and 2) to the sets of brake disks 87 and 89 is a generally annular engagement member 91 which is biased to the left in FIGS. 1 and 2 by the engagement portion 69 of the lock piston 65 whenever the lock piston is in the spring apply position of FIGS. 1 and 2. In the spring apply position, the engagement member 91 clamps the brake disks 87 and 89 in engagement with each other and with an adjacent surface 93 of the housing member, thus retarding rotation of the brake member 79 relative to the housing of the motor (including the end cap assembly 21). The rotation (or lack of rotation) of the brake member 79 relative to the housing of the motor is representative of the movement of the output shaft 43, such that the brake member 79 may be referred to hereinafter and in the appended claims as an "output member". In other words, retarding rotation of the brake member 79 yields the same overall result as retarding rotation of the output shaft 43, because of the interconnection therebetween of the main drive shaft 51.

Figure 3:
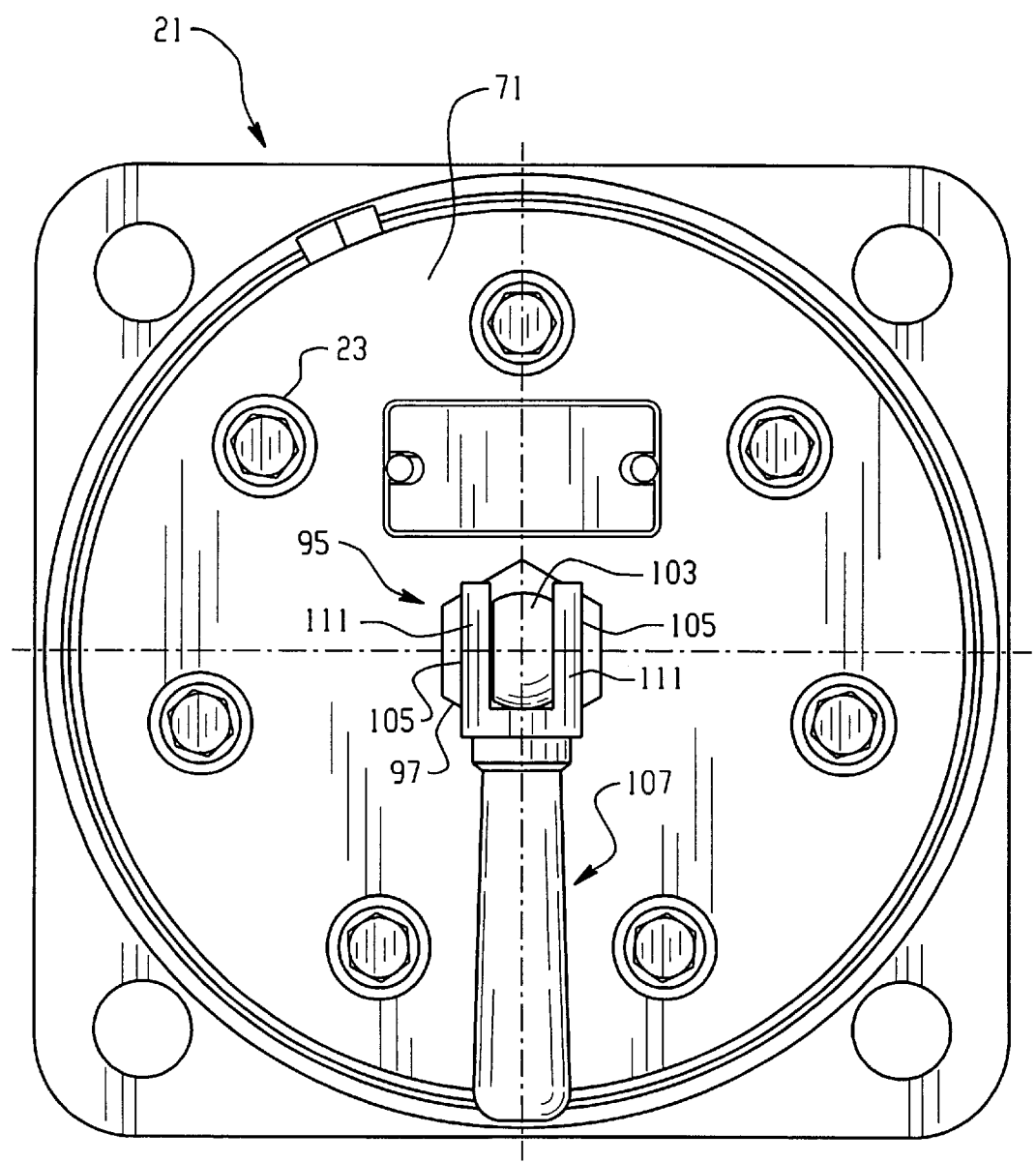
FIG. 3 is an end view, taken from the right in FIG. 2, illustrating the handle of the brake release mechanism of the present invention.

The portions of the brake assembly described up to this point are generally well known in terms of the general construction and function. Referring now primarily to FIGS. 2 and 3, a disengagement mechanism, generally designated 95, will be described in some detail. Disposed in threaded engagement with a central, threaded opening of the end cap member 71 is an externally threaded plug 97. The plug 97 defines a central, cylindrical opening, and slidably disposed in the opening is a bolt 99, most of which is cylindrical, and which includes a seal member 98 to prevent leakage of fluid between the opening and the bolt 99. However, a forward end 101 of the bolt 99 is externally threaded, and is received within an internally threaded opening defined by the lock piston 65, such that the lock piston 65 and the bolt 99 are fixed to move axially as one.

The bolt 99 includes a flattened head portion 103 (see FIG. 3), which is disposed between a pair of side portions 105 of a handle member 107. Preferably, the side portions 105 of the handle member 107 are retained, relative to the bolt 99 by suitable means, such as a roll pin 109. In accordance with one important aspect of the invention, each of the side portions 105 includes a cam surface 111, the function of which will be described subsequently. FIG. 2 illustrates the "normal" position of the disengagement mechanism 95, in which the brake assembly is free to operate as it normally does, i.e., with the vehicle stationary, the Belleville washers 73 bias the lock piston 65 forwardly, and the brake discs 87 and 89 are pressed together, retarding rotation of the output as described previously.

When the motor is operated, by porting pressurized fluid to the inlet port 25, pressurized fluid is also communicated to a chamber 113 (see FIG. 2) disposed forwardly of the lock piston 65. This communication of fluid may be accomplished in any one of several ways, none of which are essential features of the present invention. There may be provided a separate pilot hydraulic system to communicate a pilot pressure to the chamber 113, or case pressure may be "regulated" relative to the reservoir pressure and bled to the chamber 113. In any case, the fluid pressure in the chamber 113 will bias the lock piston 65 rearwardly (to the right in FIGS. 1, 2, and 4), in opposition to the force of the Belleville washers 73, to a fully retracted position in which the brake discs 87 and 89 are "disengaged". It should be noted the in the subject embodiment, the fully retracted position of the lock piston 65 involves travel of about 0.070 inches (about 1.577 mm). As is well known to those skilled in the brake art, the term "disengaged", in regard to a plurality of friction discs, can mean either actually disengaged (i.e., not touching) or still in engagement, but with insufficient force for the discs to be able to transmit substantial torque.

The operation of the disengagement mechanism 95 will now be described, referring primarily to FIGS. 2 and 4. It should be understood that a pre-condition for the use of the disengagement mechanism 95 is that there be no substantial fluid pressure in the chamber 113 When it is desired to tow the vehicle, as one example of the use of the invention, the vehicle operator begins to rotate the handle member 107 from the disengaged position of FIG. 2 in a counterclockwise direction, generally toward the position of FIG. 4. As the handle member 107 reaches approximately a "3 o'clock" position in FIGS. 2 and 4, the cam surfaces 111 on the side portions 105 begin to engage an adjacent reaction surface 115 of the plug 97.

Figure 4:
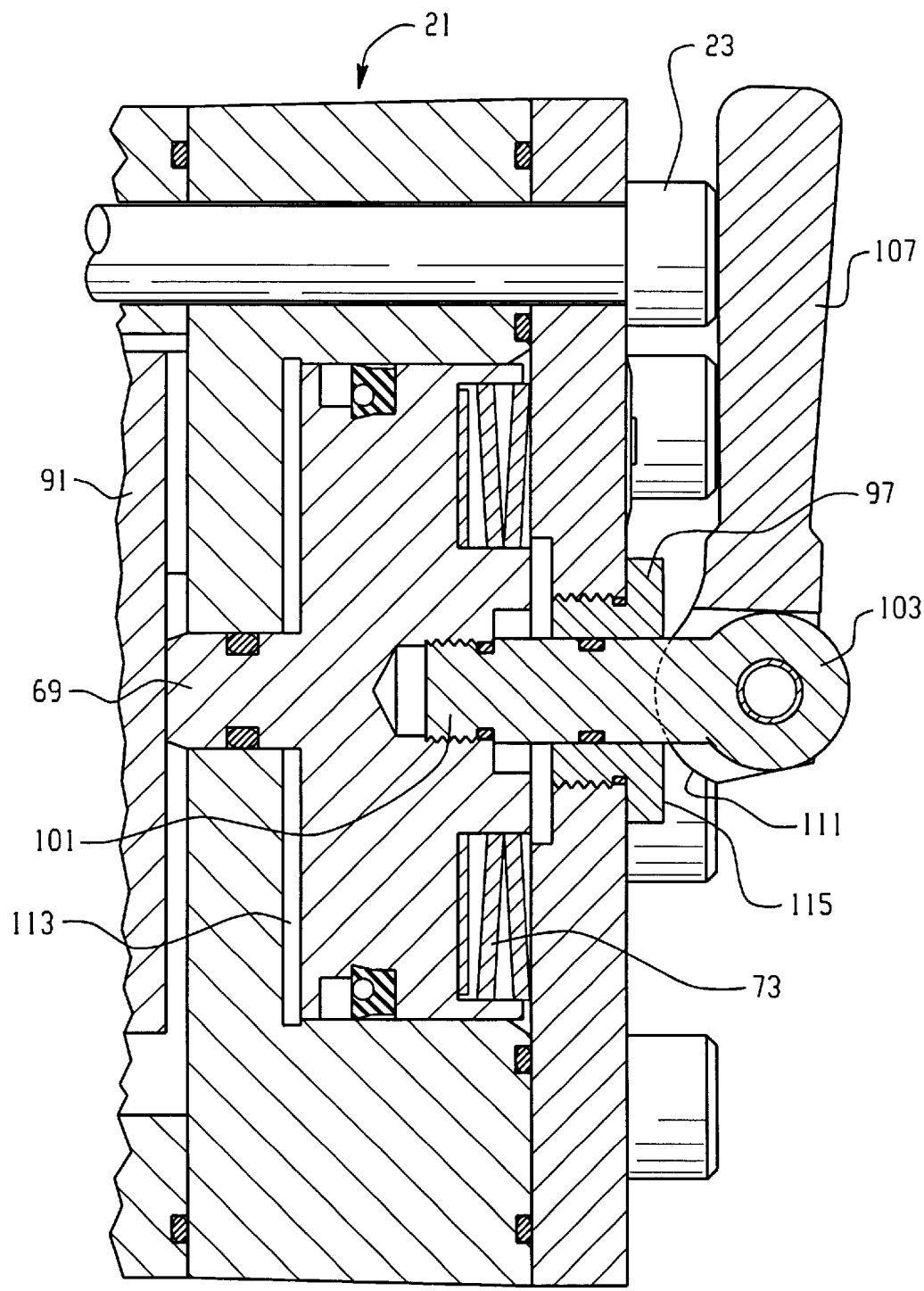
FIG. 4 is an enlarged, fragmentary, axial cross-section similar to FIG. 2, but with the brake release mechanism of the present invention in its disengagement position.

In the subject embodiment, and by way of example only, from the time the cam surfaces 111 begin to engage the reaction surface 115, continued movement of the handle member 107 to the disengagement position of FIG. 4 will result in moving the lock piston 65 about 0.040 inches (about 1.016 mm) rearwardly, to a partially retracted position, in opposition to the force of the Belleville washers 73. Stated another way, the cam surfaces 111 have a "cam rise" of about 0.040 inches (about 1.016 mm). When the handle member 107 reaches the disengagement position of FIG. 4, the frictional engagement between the cam surfaces 111 and the reaction surface 115 is sufficient to hold the handle member 107 in the upright position shown in FIG. 4. The reason for having the disengagement mechanism 95 move the lock piston 65 to only a partially retracted position will now be explained.

After the vehicle has been towed, for example, to the next work site, and it is desired again to operate the vehicle in the normal manner, pressurized fluid is communicated to the chamber 113, moving the lock piston from the partially retracted position of FIG. 4 to a fully retracted position, not shown herein, in which the Belleville washers 73 are nearly fully "bottomed out" and the lock piston 65 is against an inside surface of the end cap member 71. Such movement of the lock piston 65 to the fully retracted position moves the bolt 99 to the right from the position shown in FIG. 4, and relieves the engagement of the cam surfaces 111 and the reaction surface 115. With the engagement of the surfaces 111 and 115 relieved, there is nothing to hold the handle member 107 in the disengagement position of FIG. 4, and the handle member 107 drops down to the normal position of FIG. 2. Thereafter, the next time the pressure in the chamber 113 is relieved, the Belleville washers 73 will again be able automatically to bias the lock piston 65 to the spring-applied condition of the brake discs 87 and 89.

Thus, the present invention provides an improved brake assembly having a means for manually releasing (disengaging) the brake, which adds very little to the overall size and cost of the motor and brake assembly. Furthermore, the disengagement mechanism of the invention is automatically returned to its normal condition as soon as the brake is next pressure released, thus relieving the vehicle operator of the burden of having to remember to return the mechanism to normal after each manual release of the brakes.

Referring now primarily to FIGS. 5 through 8, an alternative embodiment of the invention will be described. As may best be seen in FIG. 4, there may be situations in which, after there is fluid pressure in the chamber 113, moving the lock piston to the FIG. 4 position, the handle 107 still may not fall to the disengaged position of FIG. 2. Therefore, in the alternative embodiment of FIGS. 5 through 8, the roll pin 109 is not merely received within a close fit bore in the side portions 105, as in the embodiment of FIGS. 1 through 4. Instead, and as is best shown in FIG. 5, the bolt 99 is provided with a flattened head 117, which defines an L-shaped opening 119, with the roll pin 109 passing through the opening 119. The opening 119 includes an upper portion 121 and a rearward portion 123, the function of which will now be described.

When the handle member 107 is in the upright position shown in FIG. 6, with the roll pin in engagement with the upper portion 121, there is frictional engagement between the cam surfaces 111 and the reaction surface 115, as described previously, thus maintaining the handle member 107 in the upright position. When pressure is again communicated to the chamber 113, biasing the lock piston 65 to the fully retracted position, the bolt 99 moves to the right, to the position shown in FIG. 7, in which the cam surfaces 111 are no longer in frictional engagement with the reaction surface 115. Unlike the main embodiment, the presence of the L-shaped opening 119 permits the handle member 107 to drop from the vertical position shown in FIG. 6 to that shown in FIG. 7, in which the roll pin 109 is no longer in engagement with the upper portion 121. Typically, from the position shown in FIG. 7, the handle member 107 would fall to the disengagement position shown in FIG. 2. However, in accordance with an important feature of this embodiment, even if the handle member 107 stays in the position shown in FIG. 7, the disengagement mechanism 95 will still operate as intended.

Referring now primarily to FIG. 8, this embodiment is of benefit the next time that the chamber 113 is relieved of pressure, for the purpose of the brake discs 87 and 89 again being biased by the Belleville washers 73 into their brake applied condition. When the brake discs 87 and 89 are applied, the lock piston 65 is biased to the left as explained previously, pulling the bolt 99 to the left in FIG. 8, until the roll pin 109 is disposed within the rearward portion 123 of the L-shaped opening 119. In this position of the bolt 99, the cam surfaces 111 may or may not be in engagement with the reaction surface 115, but if such engagement occurs, it would not be with the same frictional force as in the position shown in FIG. 6.

The invention has been described in great detail in the foregoing specification, and it is believed that various alterations and modifications of the invention will become apparent to those skilled in the art from a reading and understanding of the specification.

It is intended that all such alterations and modifications are included in the invention, insofar as they come within the scope of the appended claims.

What is claimed is:

1. A brake assembly including housing means defining an internal chamber; a first means defining a first braking surface fixed to be non-rotatable relative to said housing means, a second means defining a second braking surface fixed to be non-rotatable relative to an output member; a lock piston disposed in said internal chamber and being moveable between a retracted position and an applied position in which said lock piston causes engagement of said first and second braking surfaces to retard movement of said output member relative to said housing means; mechanical biasing means operably associated with said lock piston and operable continually to bias said lock piston toward said applied position; said housing means and said lock piston cooperating to define a pressure chamber operable, in the presence of pressurized fluid in said pressure chamber, to bias said lock piston toward said retracted position; characterized by:

(a) disengagement means operably associated with said lock piston and including a manually operable handle disposed external to said housing means;

(b) said manually operable handle being moveable between a normal position and a disengagement position operable to move said lock piston toward at least a partially retracted position, in opposition to the force of said mechanical biasing means.

2. A brake assembly as claimed in claim 1, characterized by said manually operable handle includes a cam surface in operable engagement with a reaction surface fixed relative to said housing means, whereby progressive movement of said handle from said normal position to said disengagement position causes progressive movement of said lock piston from said applied position to said partially retracted position.

3. A brake assembly as claimed in claim 2, characterized by said handle being maintained in said disengagement position by frictional engagement between said cam surface and said reaction surface, in the absence of pressurized fluid in said pressure chamber.

4. A brake assembly as claimed in claim 3, characterized by the presence of pressurized fluid in said pressure chamber being operable to bias said lock piston to a fully retracted position, beyond said partially retracted position, movement of said lock piston to said fully retracted position relieving said frictional engagement between said cam surface and said reaction surface.

5. A brake assembly as claimed in claim 4, characterized by said disengagement means being configured whereby, when said lock piston moves to said fully retracted position, relieving said frictional engagement between said cam surface and said reaction surface, said handle moves from said disengagement position to said normal position.

6. A brake assembly as claimed in claim 5, characterized by said disengagement means being configured whereby said movement of said handle from said disengagement position to said normal position occurs in response to the influence of gravity.

7. A brake assembly as claimed in claim 5, characterized by said disengagement means being configured whereby said handle moves from said disengagement position to a normal position without a change in the orientation of said handle.

8. A brake assembly as claimed in claim 7, characterized by said disengagement means being configured whereby, with said handle in said normal position, said lock piston may again move to said applied position, in the absence of fluid pressure in said pressure chamber, without a change in the orientation of said handle.

\* \* \* \* \*